United States Patent [19]

Hafla et al.

[11] Patent Number: 4,847,960
[45] Date of Patent: Jul. 18, 1989

[54] TOOL TURRET

[75] Inventors: Dietmar F. Hafla, Hohengehren; Günther Sommer, Stuttgart, both of Fed. Rep. of Germany

[73] Assignee: Index-Werke KG Hahn & Tessky, Fed. Rep. of Germany

[21] Appl. No.: 215,572

[22] Filed: Jul. 6, 1988

[30] Foreign Application Priority Data

Jul. 9, 1987 [DE] Fed. Rep. of Germany ....... 3722643

[51] Int. Cl.⁴ .............................................. B23B 3/16
[52] U.S. Cl. .......................................... 29/40; 29/53; 29/55; 74/801
[58] Field of Search ................. 29/40, 39, 38 R, 37 R, 29/38 C, 36, 48.5 A, 50, 53; 82/36 P; 74/801, 789, 805, 799; 408/35

[56] References Cited

U.S. PATENT DOCUMENTS

| 2,682,698 | 7/1954 | Berthiez | 29/40 |
| 3,750,244 | 8/1973 | Smith | 408/35 X |
| 3,845,532 | 11/1974 | Smith | 29/40 |
| 4,087,890 | 5/1978 | Ishizuka et al. | 29/37 A |
| 4,302,870 | 12/1981 | Schalles et al. | 29/48.5 A X |
| 4,704,926 | 11/1987 | Boffelli | 82/36 A |
| 4,769,885 | 9/1988 | Nakano | 29/40 |

FOREIGN PATENT DOCUMENTS

| 511699 | 4/1955 | Canada | 29/40 |
| 885804 | 8/1953 | Fed. Rep. of Germany | 29/40 |
| 2849167 | 12/1980 | Fed. Rep. of Germany | 29/40 |
| 29289121 | 1/1981 | Fed. Rep. of Germany | 29/40 |
| 3624268 | 1/1988 | Fed. Rep. of Germany | 74/801 |
| 322542 | 2/1972 | U.S.S.R. | 74/801 |

Primary Examiner—William Briggs
Attorney, Agent, or Firm—Leydig, Voit & Mayer

[57] ABSTRACT

Tool turret for NC automatic lathes comprising a turret body, in which a plurality of tool drive shafts arranged about a turret indexing axis are rotatably mounted, and comprising a main drive shaft coaxial to the turret indexing axis and in drive connection with the tool drive shafts via a miter gear arrangeed in the turret body, as well as a change-over gear for driving the tool drive shafts at different rotational speeds. In order to provide a space-saving and simple construction, the change-over gear is arranged in the turret body between the main drive shaft and the tool drive shaft and is designed as a gear adapted to be changed over only when at a standstill and having no idling state between the drive positions.

9 Claims, 2 Drawing Sheets

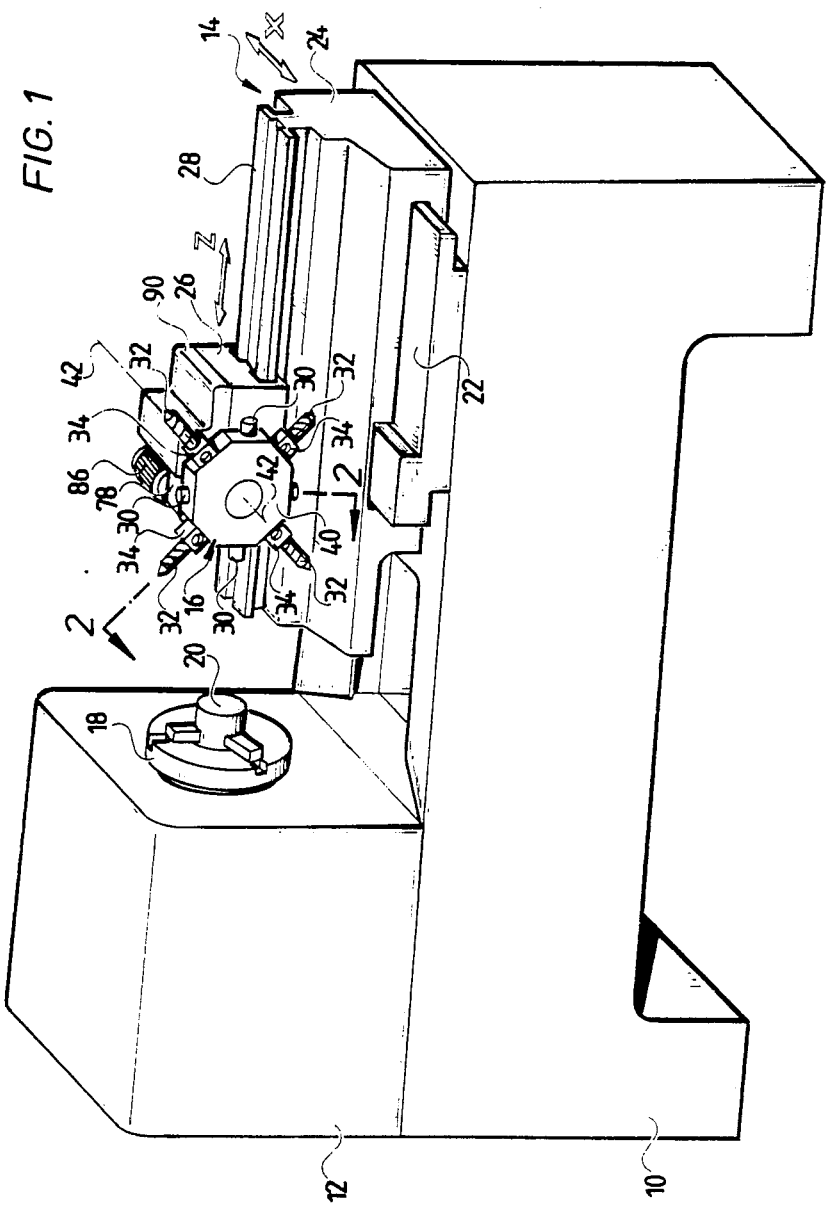

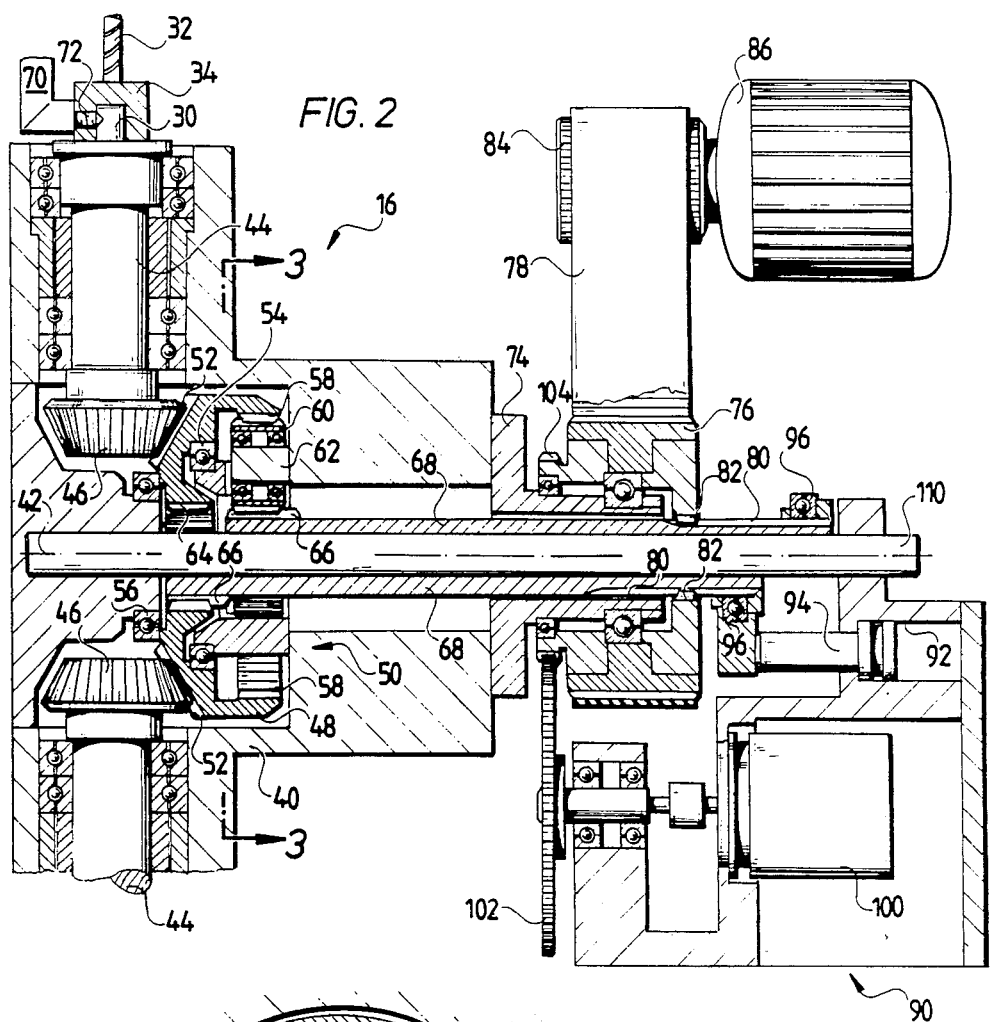
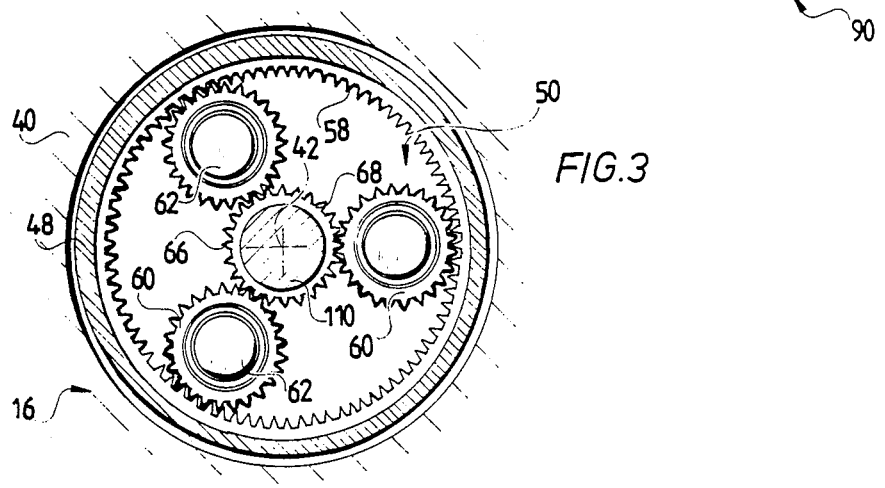

TOOL TURRET

The invention relates to a tool turret, in particular for an NC automatic lathe, comprising a turret body, a plurality of tool drive shafts arranged about a turret indexing axis and rotatably mounted in this body, a main drive shaft coaxial to the turret indexing axis and in drive connection with the tool drive shafts via a miter gear arranged in the turret body as well as an change-over gear for driving the tool drive shafts at different rotational speeds.

In order to be able to drive tools, such as, for example, drills arranged on a tool carrier so as to be interchangeable, at different speeds toolholders are available which are changed with the tool and in which a gear is installed to provide a transmission ratio corresponding to the particular tool between the tool drive shaft located in the tool carrier and the relevant tool. The toolholders having a built-in gear which are presently available on the market are of different constructional sizes depending on the transmission ratio of their gearing. As a consequence, during automatic tool changing (including the toolholder) the tool gripping device effecting changing of the tool has to move to various positions to change different tools, both in the axial direction due to the different constructional sizes of the toolholders and also with respect to the position regarding the angle of rotation.

Machine tools comprising a tool carrier for interchangeable driven tools are also available, in which a main drive shaft serving to drive the tools is driven via an automatic change-over gear.

Indexable couplings or sliding gears in these automatic change-over gears bring about an alteration in the transmission ratio. This leads to a first disadvantage. During indexing, the angle of rotation of a tool is no longer monitored by the machine control and so a search run has to be made prior to automatic changing of the tool to bring the tool into the angular position which is required for an automatic tool change. The second disadvantage of this known construction results from the relatively large distance of the change-over gear from the toolholders. This means that their drive is, torsionally, relatively pliable and so the tools tend to chatter during high-speed machining operations.

The object underlying the invention was therefore to provide an change-over gear for a tool carrier designed as a tool turret which does not have the disadvantages specified above. In this connection it should be noted that known tool turrets comprise a miter gear disposed between the main drive shaft and the tool drive shafts. This miter gear consists of a bevel gear seated on the main drive shaft and bevel gears on each of the tool drive shafts which mesh with the bevel gear of the main drive shaft.

Proceeding on the basis of a tool turret of the type described at the outset, this object may be accomplished in accordance with the invention in that the change-over gear is arranged in the turret body between the main drive shaft and the tool drive shafts and is designed as a gear adapted to be changed over when at a standstill and having no idling state between the drive positions. Due to the arrangement of the change-over gear in the turret body between the main drive shaft and the tool drive shafts the drive of the latter will be torsionally rigid. The construction of the change-over gear as described does allow the gear to be changed over only when at a standstill. However, it has the advantage that a metering or monitoring device for the angle of rotation is never dissociated from the tools to be monitored with respect to their angular position and so a tool which is to be changed automatically can easily be brought to a standstill by the machine control in that angular position in which it has to be gripped by the tool gripping device. In comparison with use of toolholders having built-in gears, the invention has the advantage that standard toolholders can be used and these are all of the same size so that the tool gripping device does not need to be brought up to different changing positions dependent on the respective tool which is to be changed.

To avoid any difficulties during changing over of the change-over gear of the inventive tool turret and coordination of the angular position of a tool with the position of a metering device monitoring this angular position, an embodiment is recommended, in which the change-over gear is designed so that in each drive position the transmission ratio between the tool drive shafts (rotational speed $n_w$) and a metering device (rotational speed $n_m$) monitoring these shafts is such that this transmission ratio $n_w:n_m$ is always an integer. In a construction of this type, only the zero position of the metering device need be set prior to an automatic tool change since the angular position of the tool to be changed, which is necessary for changing the tool, will then automatically be set.

The invention may have a particulary simple and space-saving construction when the change-over gear is designed to be coaxial to the turret indexing axis. It is advantageous in the same respect when the miter gear and the change-over gear have at least one common gear element.

Particulary large differences in the transmission ratio may be achieved simultaneously with a space-saving mode of construction when the change-over gear is a sun-and-planet gear, whereby the ring gear of the planet gear is appropriately designed at the same time as the bevel gear of the miter gear.

A particularly advantageous change-over gear comprises a sun-and-planet carrier which is rigidly connected with the turret body and a main drive shaft which is displaceable between three positions in the direction of the turret indexing axis and designed such that in a first position it is in drive connection with a planet gear or a plurality of planet gears, in a third position in rotational drive connection with the ring gear only and in a second, middle position is non-rotatably connected with the planet gear or gears as well as with the ring gear. This is achieved, for example, when the main drive shaft comprises a pinion in the region of its front end for meshing with the planet gears and an eccentric pin at its front end face for insertion into a bore in the ring gear of the sun-and-planet gear. This bore is designed such that the pin enters the said bore before the pinion disengages from the planet gears. It is, however, simpler for the ring gear to have an inner gear ring and the main drive shaft to have an outer gear ring which is adapted to be inserted into the teeth of the planet gear or gears and the inner gear ring of the ring gear and the length of which in axial direction is designed to be such that the outer gear ring of the main drive shaft does not release the planet gears until it has already connected the ring gear non-rotatably with the main drive shaft or, vice versa, is already engaged on the planet gears before it disengages from the ring gear.

Additional features, advantages and details of the invention result from the attached claims and/or the following description and attached drawings of a particularly advantageous embodiment of the inventive tool turret. In the drawings, FIG. 1 is a front view of an automatic lathe comprising an inventive tool turret as tool carrier;

FIG. 2 is an axial section through the tool turret as well as the device for metering the angle of rotation and the drive means for the driven tools held by the tool turret, and FIG. 3 is a section through the sun-and-planet gear forming the change-over gear of the tool turret along line 3—3 in FIG. 2.

FIG. 1 shows a machine bed 10 bearing a headstock 12 and a cross slide system 14 for a tool turret 16. A main work spindle holding a chuck 18 for a workpiece 20 is rotatably mounted in the headstock 12. A guideway 22 extending in the direction of the X-axis is secured to the machine bed 10 and serves to guide a lower carriage 24 of the cross slide system 14 in the direction of the X-axis. An upper carriage 26 of the cross slide system 14 which mounts the tool turret 16 is mounted so as to be displaceable by means of a Z-guideway 28 on the lower carriage 24 in the direction of the Z-axis. Drive means for displacing the two carriages 24 and 26 are not illustrated.

The tool turret 16 is, as will be shown in the following, intended to be rotatable about an indexing axis extending in the direction of the X-axis. The tool turret 30 has a plurality of toolholder receiving means 30 placed around this indexing axis. Tools 32 with their toolholders 34 may be inserted into these receiving means with the aid of a gripping device of an automatic tool changing means. Since the automatic changing of tools is known from the state of the art, it is not necessary to go into further detail on this. The tools designated 32 in FIG. 1 are drills which are intended to be driven in accordance with the invention.

The construction of the tool turret 16 will now be explained in greater detail on the basis of FIGS. 2 and 3.

The tool turret 16 has a turret body 40 which is mounted on the upper carriage 26, in a manner not illustrated, for rotation about an axis extending parallel to the X-axis of the automatic lathe. This axis, which is designated in the following as the turret indexing axis is designated 42 in FIGS. 2 and 3. In the illustrated, preferred embodiment, the axes of tool drive shafts 44 rotatably mounted in the turret body 40 extend radially to the turret indexing axis 42 and are provided at their radially inner ends with bevel gears 46. The latter mesh with a ring gear 48 of a sun-and-planet gear 50 which is installed and arranged, in accordance with the invention, coaxially to the turret indexing axis 42. So that the tool drive shafts 44 can be driven by the ring gear 48, this has an outer gear ring 52 which is designed in the form of a bevel gear and meshes with the bevel gears 46.

The ring gear 48 is mounted on the turret body 40 with the aid of bearings 54 and 56 so that it can rotate but is not axially displaceable. It has a first inner gear ring 58 meshing with three planet gears 60 which are rotatably mounted on bearing pins 62 secured to the turret body 40 and so the turret body 40 also forms the sun-and-planet carrier. In addition, the ring gear 48 has a second inner gear ring 64.

An outer gear ring 66 of a hollow shaft 68 which is displaceable in axial direction interacts with the planet gears 60 and the second inner gear ring 64. The hollow shaft forms the main drive shaft for all the tool drive shafts 44 and is therefore designated as such in the following. In FIG. 2, it is illustrated above the turret indexing axis 42 in one end position, in which its outer gear ring 66 meshes only with the planet gears 60, and below the turret indexing axis 42 in its other end position, in which its outer gear ring 66 engages only with the second inner gear ring 64 of the ring gear 48. As shown by FIG. 2, the length of the outer gear ring 66 of the main drive shaft 68 in axial direction is such that, according to the invention, it already engages in the second inner gear ring 64 of the ring gear 48 before it is separated from the planet gears 60 or, vice versa, the outer gear ring 66 engages in the teeth of the planet gears 60, when the main drive shaft 68 is displaced to the right out of its left-hand end position, before it leaves the second inner gear ring 64 of the ring gear 48. According to a second feature of the invention, the radial distance between the second inner gear ring 64 and the turret indexing axis 42 is the same as the radial distance between the gear rings of the planet gears 60 and the turret indexing axis.

FIG. 2 shows, at the top, one of the driven tools 32 with its toolholder 34 as well as a tool gripping device 70 which is intended to be provided with a screwdriver, which is not illustrated, for releasing a tightening screw 72 of the toolholder 34 as well as, if necessary, with clamping jaws for gripping the toolholder.

A bell-shaped bearing 74 is secured to the rear end face of the turret body 40 and a gear wheel 76 for a toothed belt 78 is rotatably mounted thereon. The main drive shaft 68 has at its rear end, shown on the right in FIG. 2, an involute-tooth gear 80 in which a correspondingly designed inner gear ring 82 of the gear wheel 76 engages. Both sets of teeth are designed such that the main drive shaft 68 may be displaced in its longitudinal direction relative to the gear wheel 76 in the manner illustrated in FIG. 2. The toothed belt 78 runs over a gear wheel 84 of a motor 86 which is intended to be mounted on the upper carriage 26 (cf. FIG. 1). This carriage also mounts a housing 90 shown in FIG. 2 which forms a pressure cylinder 92 for a piston 94 and is provided with two pressure medium connections (not illustrated) so that the piston 94 can be moved to the right and left in accordance with FIG. 2. The latter engages an axial bearing 96, via which the main drive shaft 68 can be displaced in axial direction with the aid of the piston 94. The housing 90 also accommodates an angular position sensor 100 which forms the metering device in the sense of the attached claims and is driven by a gear wheel 102 rotatably mounted on the housing 90. This gear wheel meshes with teeth 104 of the gear wheel 76. When the main drive shaft 68 is rotated, the angular position sensor 100 will also be driven.

In a preferred embodiment of the inventive construction, the transmission ratios in the two states of the sun-and-planet gear 50 forming the change-over gear are the following, whereby "i" designates the ratio rotational speed of the driving element:rotational speed of the driven element:

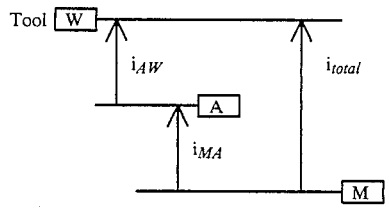

$$i1\ total = i1AW \times iMA = \frac{1}{2} \times \frac{1}{1.5} = \frac{1}{3}$$

$$i2\ total = i2AW \times iMA = \frac{1.5}{1} \times \frac{1}{1.5} = \frac{1}{1}$$

wherein
W = tool
A = main drive shaft
M = metering device or angular position sensor.

The invention therefore obviates any search run to locate the changing position of the tools for the purpose of an automatic tool change. The same applies when a tool has to begin machining in a predetermined angular position, as is the case when cutting a thread or groove in a certain angular position. In addition, all the toolholders for the driven tools may be of the same design. Moreover, considerable costs may be saved in comparison with the state of the art, in which gears are installed in the toolholder, since the torque for all the tools is converted only once in the turret body.

As shown in the above, the outer gear ring 66 of the main drive shaft 68 forms the central or so-called sun gear of the sun-and-planet gear. It merely remains to be noted that the main drive shaft 68 is displaceable and rotatably mounted on an axis 110 which is arranged coaxially to the turret indexing axis 42 and is held on the one hand in the turret body 40 and, on the other, in the housing 90.

The present disclosure relates to the subject matter disclosed in German application No. P 37 22 643.6 of July 9, 1987, the entire specification of which is incorporated herein by reference.

What is claimed is:

1. A tool turret comprising a turret body having an indexing axis, a plurality of tool drive shafts arranged about said indexing axis and rotatably mounted in said body, a main drive shaft coaxial to said indexing axis and in drive connection with said tool drive shafts via a miter gear arranged in said turret body, the improvement comprising a change-over gear arranged in said turret body between said main drive shaft and said tool drive shafts and having at least two gear trains as well as a movable gear, means mounting said movable gear for movement between at least two drive positions to effect a tool drive shaft speed change, said movable gear being adapted to be in engagement with both said gear trains when it is between said two drive positions.

2. Tool turret as defined in claim 1, characterized in that the change-over gear 50, 66 is designed so that in each drive position the transmission ratio between the tool drive shafts 44 and a metering device 100 monitoring said shafts is such that this transmission ratio is always an integer.

3. Tool turret as defined in claims 1 or 2, characterized in that the change-over gear 50, 66 is designed to be coaxial to the turret indexing axis 42.

4. Tool turret as defined in claim 1, characterized in that the miter gear 46, 52 and the change-over gear 50, 66 have at least one common gear element 48.

5. Tool turret as defined in claim 3, characterized in that the change-over gear 50, 66 is designed as a sun-and-planet gear.

6. Tool turret as defined in claim 5, characterized in that the ring gear 48 of the sun-and-planet gear 50, 66 also forms a bevel gear 52 of the miter gear 46, 52.

7. Tool turret as defined in claim 5, characterized in that the sun-and-planet carrier 62 is rigidly connected with the turret body 40 and the main drive shaft 68 is displaceable between three positions in the direction of the turret indexing axis 42 and designed such that in a first position it is in drive connection with a planet gear 60 only, in a third position in rotational drive connection with the ring gear 48 only and in a second, middle position is non-rotatably connected with the planet gear 60 as well as with the ring gear 48.

8. Tool turret as defined in claim 7, characterized in that the ring gear 48 has an inner gear ring 64 and the main drive shaft 68 has an outer gear ring 66 adapted to be inserted into the teeth of the planet gear 60 and the inner gear ring 64 of the ring gear 48.

9. Tool turret as defined in claim 2, characterized in that the metering device 100 is in rotational drive connection with the change-over gear 50 via a gear 104, 102 and the main drive shaft 68.

* * * * *